United States Patent
Kwon et al.

(10) Patent No.: US 9,123,955 B2
(45) Date of Patent: Sep. 1, 2015

(54) NEGATIVE ACTIVE MATERIAL, LITHIUM BATTERY INCLUDING THE MATERIAL, AND METHOD FOR MANUFACTURING THE MATERIAL

(71) Applicant: SAMSUNG SDI CO., LTD., Yongin-si, Gyeonggi-do (KR)

(72) Inventors: Seung-Uk Kwon, Yongin-si (KR); Sung-Hwan Moon, Yongin-si (KR); Chun-Gyoo Lee, Yongin-si (KR); Jae-Hyuk Kim, Yongin-si (KR); Soon-Sung Suh, Yongin-si (KR); Chang-Ui Jeong, Yongin-si (KR); Yo-Han Park, Yongin-si (KR); Yury Matulevich, Yongin-si (KR); Jong-Seo Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 142 days.

(21) Appl. No.: 13/742,281

(22) Filed: Jan. 15, 2013

(65) Prior Publication Data
US 2013/0266865 A1 Oct. 10, 2013

Related U.S. Application Data

(60) Provisional application No. 61/621,380, filed on Apr. 6, 2012.

(51) Int. Cl.
*H01M 4/134* (2010.01)
*H01M 4/13* (2010.01)
(Continued)

(52) U.S. Cl.
CPC .............. *H01M 4/386* (2013.01); *H01M 4/624* (2013.01); *H01M 10/052* (2013.01); *H01M 2004/021* (2013.01)

(58) Field of Classification Search
None
See application file for complete search history.

(56) References Cited

U.S. PATENT DOCUMENTS

| | | |
|---|---|---|
| 7,572,552 B2 | 8/2009 | Matsuno et al. |
| 7,736,806 B2 | 6/2010 | Shimamura et al. |
| 7,858,232 B2 | 12/2010 | Bito et al. |
| 2007/0111100 A1 | 5/2007 | Bito et al. |

FOREIGN PATENT DOCUMENTS

| | | |
|---|---|---|
| JP | 2004-335439 A | 11/2004 |
| JP | 2006-164960 A | 6/2006 |

(Continued)

OTHER PUBLICATIONS

A novel nanosized silicon-based composite as anode material for high performance lithium ion batteries, Electrochimica Acta, 56 (2011), 1512-1517.*

(Continued)

*Primary Examiner* — Cynthia K Walls
(74) *Attorney, Agent, or Firm* — Christie, Parker & Hale, LLP (57) ABSTRACT

A negative active material having controlled particle size distribution of silicon nanoparticles in a silicon-based alloy, a lithium battery including the negative active material, and a method of manufacturing the negative active material are disclosed. The negative active material may improve capacity and lifespan characteristics by inhibiting (or reducing) volumetric expansion of the silicon-based alloy. The negative active material may include a silicon-based alloy including: a silicon alloy-based matrix; and silicon nanoparticles distributed in the silicon alloy-based matrix, wherein a particle size distribution of the silicon nanoparticles satisfies D10≥10 nm and D90≤75 nm.

13 Claims, 7 Drawing Sheets

(51) Int. Cl.
*H01M 4/36* (2006.01)
*H01M 4/38* (2006.01)
*H01M 4/62* (2006.01)
*H01M 10/052* (2010.01)
*H01M 4/02* (2006.01)

(56) References Cited

FOREIGN PATENT DOCUMENTS

| JP | 2007-165300 A | 6/2007 |
|---|---|---|
| JP | 2009-245773 A | 10/2009 |
| JP | 2011-034836 A | 2/2011 |
| KR | 10-2005-0020571 A | 3/2005 |
| KR | 2010-0078440 A | 7/2010 |
| WO | WO 03/079469 A | 9/2003 |

OTHER PUBLICATIONS

Patent Abstracts of Japan and Machine English Translation of JP 2009-245773 A, 37 Pages.

Extended European Search Report, Dated Aug. 12, 2013 for European Application No. 13162609.5, 6 Pages.

* cited by examiner

NEGATIVE ACTIVE MATERIAL, LITHIUM BATTERY INCLUDING THE MATERIAL, AND METHOD FOR MANUFACTURING THE MATERIAL

CROSS-REFERENCE TO RELATED APPLICATION

This application claims priority to and the benefit of U.S. Provisional Application No. 61/621,380, filed on Apr. 6, 2012, in the United States Patent & Trademark Office, the disclosure of which is incorporated herein in its entirety by reference

BACKGROUND

1. Field

Aspects of one or more embodiments of the present invention relate to a negative active material, a lithium battery including the same, and a method of manufacturing the negative active material.

2. Description of the Related Art

Lithium secondary batteries generate electric energy by oxidation and reduction reactions occurring when lithium ions are intercalated into/deintercalated from a positive electrode and a negative electrode, each including an active material that enables intercalation and deintercalation of lithium ions, with an organic electrolytic solution or a polymer electrolytic solution interposed between the positive electrode and the negative electrode.

As a negative active material for lithium secondary batteries, a carbonaceous material such as artificial and natural graphite, and hard carbon and a non-carbonaceous material such as Si and Sn, which enable intercalation or deintercalation of lithium ions, are used and studies thereon have been performed.

Non-carbonaceous materials such as Si and Sn have a very high capacity that is 10 times greater than that of graphite. However, due to a volumetric expansion during charging and discharging, capacity may be rapidly degraded. Accordingly, even though much research into various alloys and complexes has been performed, a further development thereof to be applied to batteries is needed.

SUMMARY

Aspects of one or more embodiments of the present invention are directed toward a negative active material having a large capacity improved by inhibiting (or reducing) volumetric expansion.

Aspects of one or more embodiments of the present invention are directed toward a lithium battery including the negative active material.

Aspects of one or more embodiments of the present invention are directed toward a method of manufacturing the negative active material.

According to one or more embodiments of the present invention, a negative active material for a lithium battery includes: a silicon-based alloy. The silicon-based alloy includes: a silicon alloy-based matrix; and silicon nanoparticles distributed in the silicon alloy-based matrix, a particle size distribution of the silicon nanoparticles satisfying D10≥10 nm and D90≤75 nm.

The silicon-based alloy may include silicon (Si) and at least one metal selected from the group consisting of Ca, Sc, Ti, V, Cr, Mn, Fe, Co, Ni, Cu, Zn, Sr, Y, Zr, Nb, Ba, Lu, Hf, Ta, and Lanthanum group elements.

The content of Si in the silicon-based alloy may be 40 at % or greater based on 100 at % of the silicon-based alloy.

The silicon-based alloy may include Si, M', and M", M' may be Al, Ti, or Fe, and M" may be Ni, Fe, or Mn.

The content of Si in the silicon-based alloy may be in a range of 40 to 80 at %, the content of M' in the silicon-based alloy may be in a range of 10 to 30 at %, and the content of M" in the silicon-based alloy may be in a range of 10 to 30 at % based on 100 at % of the silicon-based alloy.

The silicon-based alloy may include inactive silicon and active silicon, the silicon alloy-based matrix may include the inactive silicon, and the silicon nanoparticles may include the active silicon.

The active silicon may be present in an amount in a range of 40 to 80 at % based on 100 at % of the total amount of inactive silicon and active silicon in the silicon-based alloy, and the inactive silicon may be present in an amount in a range of 20 to 60 at % based on 100 at % of the total amount of inactive silicon and active silicon in the silicon-based alloy.

The silicon alloy-based matrix may be represented by Si-M'-M", M' may be Al, Ti, or Fe, and M" may be Ni, Fe, or Mn, and the silicon alloy-based matrix may include 40 to 60 at % of Si, 20 to 30 at % of M', and 20 to 30 at % of M" based on 100 at % of the total amount of the silicon alloy-based matrix In one embodiment, more than 60% of the silicon nanoparticles have a particle size in a range of 28 to 65 nm The silicon nanoparticles may have a particle size distribution such that D50 is in a range of 35 to 50 nm.

The silicon nanoparticles may have a particle size distribution such that the ratio of D90/D10 is in a range of 8.5 to 10, and the ratio of D50/D10 is in a range of 5.5 to 7.2.

The negative active material may further include a carbonaceous material for intercalating and deintercalating lithium ions, lithium metal, an alloy of lithium metal, a silicon oxide-based material, or a mixture thereof.

According to one or more embodiments of the present invention, a lithium battery includes: a negative electrode including a negative active material including a silicon-based alloy; a positive electrode opposite the negative electrode; and an electrolyte between the negative electrode and the positive electrode. The silicon-based alloy includes: a silicon alloy-based matrix; and silicon particles distributed in the silicon alloy-based matrix, a particle size distribution of the silicon particles satisfying D10≥10 nm and D90≤75 nm.

According to one or more embodiments of the present invention, a method of manufacturing a negative active material for a lithium battery includes: preparing a silicon-based master alloy; rapidly cooling and solidifying a melt of the silicon-based master alloy to prepare a rapidly cooled and solidified alloy; and pulverizing the rapidly cooled and solidified alloy to prepare a silicon-based alloy including: a silicon alloy-based matrix; and silicon-based nanoparticles distributed in the silicon alloy-based matrix, a particle size distribution of the silicon nanoparticles satisfying D10≥10 nm and D90≤75 nm.

The rapidly cooling and solidifying may be performed using melt spinning.

The master alloy may be added to an injection-molding pipe of a melt spinner and melted by high frequency induction heading in an inert atmosphere at a temperature in the range of 850 to 1600° C.

The rapidly cooling and solidifying may be achieved by injection-molding the melts to a wheel rotating at a speed in the range of 500 to 5000 rpm to induce the precipitation of the silicon nanoparticles.

The melt of the silicon-based master alloy may be injection-molded into a ribbon shape, and the thickness of the ribbon shape may be 5 to 20 μm.

The cooling speed of the rapidly cooling and solidifying may be controlled to be equal to or higher than 1000° C./s.

According to one or more embodiments of the present invention, a method of manufacturing a negative active material for a lithium battery includes: preparing a silicon-based master alloy; rapidly cooling and solidifying a melt of the silicon-based master alloy to prepare a rapidly cooled and solidified alloy; and pulverizing the rapidly cooled and solidified alloy to prepare a silicon-based alloy including a silicon alloy-based matrix and silicon-based nanoparticles distributed in the silicon alloy-based matrix, the rapidly cooling and solidifying being performed using a cooling speed equal to or greater than 1000° C./s.

According to aspects of an embodiment of the present invention, a negative active material can improve capacity and lifespan characteristics of a lithium battery by inhibiting (or reducing) volumetric expansion of a silicon-based alloy.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification. Hereinafter, the present invention will be described in more detail.

Si and Sn have been widely used as a high-capacity negative active material in lithium batteries. Theoretically, Si has a high capacity of 4200 mAh/g. However, if used alone, the capacity of Si rapidly decreases due to a volumetric expansion during charging and discharging. This is because one Si atom may react with a maximum of 4.4 lithium atoms, and the volumetric expansion may be increased up to about 400%. Over expansion may cause particles of negative active material to crack and break at cracks, and accordingly a new surface may be formed at the cracks. Further, a solid electrolyte interface (SEI) is consecutively formed due to degradation of an electrolyte. In this regard, since cracks of the particles are not uniformly generated, isolated broken pieces of the particles cannot properly participate in electrochemical reactions, resulting in capacity loss in batteries.

In order to overcome these drawbacks, the present inventors conducted research on inhibiting (or reducing) volumetric expansion of a negative active material and improving lifespan thereof by uniformly controlling the dispersion of particle size distribution of silicon nanoparticles in a silicon-based alloy.

A negative active material according to an embodiment of the present invention includes a silicon-based alloy, the silicon-based alloy including: a silicon alloy-based matrix; and silicon nanoparticles distributed in the silicon alloy-based matrix, a particle size distribution of the nanoparticles satisfying $D10 \geq 10$ nm and $D90 \leq 75$ nm.

In one embodiment, the silicon-based alloy includes silicon (Si), and at least one metal selected from the group consisting of Ca, Sc, Ti, V, Cr, Mn, Fe, Co, Ni, Cu, Zn, Sr, Y, Zr, Nb, Ba, Lu, Hf, Ta, and Lanthanum group elements. The content of Si contained in the silicon-based alloy may be 40 at % or greater based on 100 at % of the silicon-based alloy. If the content of Si is within this range, a high-capacity negative active material may be obtained.

According to an embodiment, the silicon-based alloy may include silicon (Si), and at least two metals selected from the group consisting of Ca, Sc, Ti, V, Cr, Mn, Fe, Co, Ni, Cu, Zn, Sr, Y, Zr, Nb, Ba, Lu, Hf, Ta, and Lanthanum group elements. For example, the silicon-based alloy may include Si, M', M", M' being Al, Ti, or Fe, and M" being Ni, Fe, or Mn. For example, the silicon-based alloy may be SiTiNi, SiFeAl, SiMnAl, SiFeTi, SiFeMn, or SiAlNi.

In this regard, the stoichiometry of each metal component may be suitably adjusted for characteristics of a battery as long as the total stoichiometry of the silicon-based alloy is 100 at %. For example, the silicon-based alloy may include 40 to 80 at % of Si, 10 to 30 at % of M', and 10 to 30 at % of M" based on 100 at % of the silicon-based alloy. More particularly, the silicon-based alloy may include 60 to 80 at % of Si, 10 to 20 at % of M', and 10 to 20 at % of M" based on 100 at % of the silicon-based alloy.

Silicon constituting the silicon-based alloy may include inactive silicon and active silicon. The active silicon is directly related to the capacity of the silicon-based alloy, and the inactive silicon has an inactive matrix structure and inhibits (or reduces) the volumetric expansion of the silicon-based alloy. The active silicon may be precipitated in the inactive matrix as nanoparticles and may be distributed therein. The silicon nanoparticles may be crystalline or non-crystalline. In one embodiment, the silicon alloy-based matrix includes the inactive silicon, and the silicon nanoparticles include the active silicon.

The content of the active silicon may be in the range of 40 to 80 at % based on 100 at % of the total content of the active silicon and inactive silicon in the silicon-based alloy. If the content of the active silicon is within the range described above, volumetric expansion of the silicon-based alloy may be efficiently inhibited (or reduced) during charging and discharging and an electrode may have excellent capacity property.

The inactive silicon may form an alloy with another metal component to form the silicon alloy-based matrix. The content of the inactive silicon may be in the range of 20 to 60 at % based on 100 at % of the total content of the active silicon and inactive silicon in the silicon-based alloy. The silicon alloy-based matrix may include 40 to 60 at % of Si, 20 to 30 at % of M', and 20 to 30 at % of M" based on the total amount of the silicon alloy-based matrix. In one embodiment, the silicon alloy-based matrix is represented by Si-M'-M", M' being Al, Ti, or Fe, M" being Ni, Fe, or Mn, and the silicon alloy-based matrix including 40 to 60 at % of Si, 20 to 30 at % of M', and 20 to 30 at % of M" based on 100 at % of the total amount of the silicon alloy-based matrix.

As such, in the silicon-based alloy having a structure in which the active silicon nanoparticles are precipitated and dispersed in the inactive silicon alloy-based matrix, when the silicon nanoparticles expand during charging and discharging, the silicon alloy-based matrix surrounding the silicon nanoparticles efficiently controls the volumetric change of the silicon nanoparticles. Thus, the silicon-based alloy may reduce an expansion rate of an electrode during charging and discharging.

In addition, the silicon-based alloy has a dispersion of particle size distribution of silicon nanoparticles in the silicon alloy-based matrix satisfying: D10≥10 nm and D90≤75 nm.

As used herein, the "particle size distribution" may be illustrated as a distribution curve of cumulative particle sizes from the smallest particle size to the largest particle size. D10, D50, and D90 respectively refer to a particle diameter of a silicon nanoparticle at 10%, 50% and 90% of a total cumulative particle diameter distribution of particles from the smallest particle diameter. The D10, D50, and D90 may be measured by using a known method, for example, using a particle size analyzer, or TEM or SEM images. Alternatively, for example, the D10, D50, and D90 may be easily obtained by measuring the particle size with a device using dynamic light-scattering, counting the number of particles within each particle size ranges by analyzing data, and calculating D10, D50, and D90 therefrom.

According to an embodiment, the particle size distribution of silicon nanoparticles may satisfy D10≥10 nm and D90≤75 nm, and more than 60% of the silicon nanoparticles may have a particle size in the range of 28 to 65 nm.

According to an embodiment, the silicon nanoparticles may have a particle size distribution such that D50 may be in the range of 35 to 50 nm. Meanwhile, the silicon nanoparticles may have a particle size distribution such that the ratio of D90/D10 may be in the range of 8.5 to 10, and the ratio of D50/D10 may be in the range of 5.5 to 7.2.

The dispersion characteristics as described above indicate that the silicon nanoparticles are relatively small and uniformly distributed within the silicon alloy-based matrix. In the silicon-based alloy having such a small and narrow particle size distribution, when the silicon nanoparticles expand during charging and discharging, the silicon alloy-based matrix surrounding the silicon nanoparticles may efficiently control volumetric change of the silicon nanoparticles. It can be identified that the volumetric expansion may be more efficiently inhibited (or reduced) in a narrow particle size distribution than a wide particle size distribution based on examples and comparative examples which will be described later. Decrease in an expansion rate of an electrode during charging and discharging may inhibit or reduce problems caused by the expansion of the electrode, i.e., reduction in lifespan caused by an increase in irreversible capacity of lithium when an additional solid electrolyte interface (SEI) layer or layers is formed due to the destruction of the negative active material.

The dispersion of the particle size distribution may be controlled by adjusting atmosphere and/or conditions during a rapid cooling and solidifying process for the preparation of the silicon-based alloy.

The negative active material includes the silicon-based alloy and may further include any other additional materials for the negative active material which is commonly used in lithium batteries in addition to the silicon-based alloy.

Examples of the additional material for the negative active material include a carbonaceous material capable of intercalating and deintercalating lithium ions such as graphite and carbon, lithium metal and alloys thereof, a silicon oxide-based material, and a mixture thereof.

According to an embodiment, the negative active material includes a silicon-based alloy and a carbonaceous material, wherein the carbonaceous material may be crystalline carbon such as natural graphite, artificial graphite, expanded graphite, graphene, carbon black, fullerene soot, carbon nanotube, and carbon fiber; amorphous carbon such as soft carbon (cold calcined carbon), hard carbon, pitch carbide, mesophase pitch carbide, and calcined cork; or a combination of at least two thereof.

As such, when the carbonaceous material is used together, oxidation reaction of the silicon-based alloy is inhibited (or reduced), and the SEI layer may be efficiently formed, so that a stable layer is formed, and the electrical conductivity may be improved. Thus, charging and discharging characteristics of lithium may further be improved.

If the carbonaceous material is used, for example, the carbonaceous material may be mixed or blended with the silicon-based alloy, or coated on the surface of the silicon-based alloy.

The content of the material for the negative active material used together with the silicon-based alloy may be in the range of 1 to 99 wt % based on the total amount of the material used for the negative active material (including the silicon-based alloy).

When the silicon-based alloy is a major component in the negative active material, the content of the silicon-based alloy may be, for example, in the range of 95 to 99 wt % based on the total amount of the material for the negative active material (including the silicon-based alloy). If graphite or amorphous carbon, e.g. pitch, is used as the material for the negative active material, graphite or pitch may be coated on the surface of the silicon-based alloy.

If the silicon-based alloy is a minor component in the negative active material, the content of the silicon-based alloy may be, for example, in the range of 1 to 5 wt % based on the total amount of the material for the negative active material (including the silicon-based alloy). If graphite or amorphous carbon, e.g. pitch, is used as the material for the negative active material, graphite or pitch may function as a buffer of the silicon-based alloy, so that lifespan of the electrode may be improved.

Hereinafter, a method of manufacturing a negative active material including a silicon-based alloy will be described.

According to an embodiment of the present invention, there is provided a method of manufacturing the negative active material by which a silicon-based alloy in which silicon nanoparticles having a suitable particle size distribution may be manufactured by preparing a silicon-based master alloy; rapidly cooling and solidifying a melt of the silicon-based master alloy to prepare a rapidly cooled and solidified alloy; and pulverizing the rapidly cooled and solidified alloy to prepare a silicon-based alloy including: a silicon alloy-based matrix; and silicon-based nanoparticles distributed in the silicon alloy-based matrix, a particle size distribution of the silicon nanoparticles satisfying D10≥10 nm and D90≤75 nm. For example, in one embodiment, the method includes preparing a master alloy having a desired composition ratio, rapidly cooling and solidifying the melted master alloy to form a rapidly solidified alloy, and pulverizing the rapidly solidified alloy.

Raw materials used to form the silicon-based alloy are not limited as long as a desired composition ratio is obtainable. For example, in order to mix elements used to form the silicon-based alloy at a desired composition ratio, elements, alloys, solid solutions, compounds of metal, or the like may be used.

In order to prepare a master alloy having a desired alloy composition ratio, for example, metal powder of each element may be quantified, mixed together at the desired alloy composition ratio, and then, subjected to a vacuum induction melting furnace to form a master alloy of a silicon-based alloy. The vacuum induction melting furnace is an apparatus capable of melting metal having a high melting point by using high frequency induction. In an initial melting operation, the inside of the vacuum induction melting furnace is vacuumized, and then inert gas such as Ar is injected into the vacuum induction melting furnace to inhibit or reduce oxidation of the prepared master alloy.

The master alloy prepared as described above is melted and the melts are rapidly cooled and solidified. The rapid cooling and solidifying process is not particularly limited, but may be performed by using, for example, melt spinning, gas atomizing, or strip casting. An alloy obtained by the rapid cooling and solidifying process has a fine structure, so that the dispersion of the particle size of the silicon nanoparticles may be efficiently controlled.

According to an embodiment, the rapid cooling and solidifying process may be performed by using melt spinning. For example, the melts of the master alloy may be cooled and solidified by ejecting the melts through a melt spinner using high frequency induction at high speed. In this regard, in order to melt the master alloy, two or three kinds of metal elements including Si and other metal elements need to be melted. Accordingly, current supply time or intensity of high frequency may be adjusted while monitoring the melting of the alloy. In addition, in order to precipitate silicon nanoparticles having a narrow particle size distribution in the silicon alloy-based matrix, atmosphere and conditions in the melting spinning may be adjusted.

For example, in one embodiment, the master alloy is added to an injection-molding pipe and melted by high frequency induction heating in an inert gas atmosphere, e.g. an argon gas atmosphere, at a temperature in the range of 850 to 1600° C. In this regard, the high frequency may be applied thereto for 5 minutes or less. For example, a pressure of the inert gas may be in the range of about 10 to about 200 Torr. The melts of the master alloy are cooled by injection-molding the melts onto a wheel rotating at a high speed, for example, in the range of 500 to 5000 rpm to induce the precipitation of the silicon nanoparticles. As the rotation speed of the wheel increases, the cooling speed increases. As the pressure of the inert gas decreases and as the cooling speed increases, the fine structure of silicon nanoparticles may be more efficiently controlled. Since the melts of the master alloy are cooled by the wheel rotating at a high speed, the melts are injection-molded into a ribbon shape. The ribbon shape and the size of the silicon nanoparticles may vary according to the cooling speed. In order to obtain fine silicon nanoparticles, the cooling speed may be, for example, about 1000° C./s or higher. More particularly, for example, the cooling speed may be in the range of 1000 to 2000° C./s. If the melt spinning is used, the melts of the master alloy may be more quickly cooled than if directly added to liquid nitrogen.

The cooling speed may be adjusted by using various methods. There are two major factors (cooling speed and chamber conditions) that affect the efficient cooling of the melts to prepare the silicon nanoparticles. Of the two factors, the cooling speed (cooling wheel) is the more important factor. However, since each of the major factors and sub-factors of the cooling method interact with each other, effects of the factors should be properly adjusted to obtain fine and uniform silicon nanoparticles.

The first major factor of the cooling method is the cooling wheel. Sub-factors affecting the cooling speed within the cooling wheel are rotation speed of the wheel, thermal conductivity and thermal capacity of the wheel, cooling method of the wheel, and distance between the wheel and the melts. The second major factor of the cooling method is the conditions of a chamber (chamber conditions) used to melt the master alloy and cool and injection-mold the melts. Sub-factors thereof are size of the chamber, vacuum state, inert gas atmosphere, such as Ar atmosphere, pressure, and the like.

Due to the high cooling speed, the particle size of the silicon nanoparticles decreases as the cooling speed is increased so that the melts are more rapidly cooled and solidified. However, due to high remaining heat of the silicon, uniform nanoparticles cannot be obtained only by rapidly cooling the melts. In order to obtain suitably uniform nanoparticles, the thickness of the ribbon obtained by rapid cooling and solidifying should be reduced or minimized to improve uniformity of the silicon nanoparticles. Thus, conditions for obtaining uniform nanoparticles may be adjusted by the vacuum state of the chamber and the inert gas atmosphere. In order to obtain suitably uniform silicon nanoparticles, the thickness of the injection-molded product having a ribbon shape may be adjusted to, for example 5 to 20 µm. For example, the thickness of the ribbon may be adjusted in the range of 7 to 16 µm.

In the injection-molded alloy product having a ribbon shape which is rapidly cooled and solidified, the silicon nanoparticles are precipitated to be uniformly distributed in the alloy, in which a precipitated area is about more than 90% based on a total area of the alloy. In addition, the silicon nanoparticles may have a narrow particle size distribution satisfying: D10≥10 nm and D90≤75 nm.

The rapidly cooled and solidified injection-molded alloy product may be pulverized into powder to be used as a negative active material. The pulverization may be performed by using any known method that is commonly used in the art. For example, an apparatus for the pulverization may include an atomizer, a vacuum mill, a ball mill, a planetary ball, a beads mill, and a jet mill.

Pulverization may be classified into dry pulverization and wet pulverization, both of which may be used herein.

Since the silicon nanoparticles of the silicon-based alloy prepared as described above may be finely and uniformly precipitated, volumetric expansion may be efficiently inhibited (or reduced) by the adjacent silicon alloy-based matrix during charging and discharging.

A lithium battery according to an embodiment of the present invention includes: a negative electrode including a negative active material including a silicon-based alloy; a positive electrode opposite to the negative electrode; and an electrolyte between the negative electrode and the positive electrode. The silicon-based alloy includes: a silicon alloy-based matrix; and silicon particles distributed in the silicon-based alloy matrix, a particle size distribution of the silicon particles satisfying D10≥10 nm and D90≤75 nm.

The negative electrode includes the negative active material, which may be manufactured, for example, by preparing a negative active material composition by mixing the negative active material, a binder, and optionally, a conductive agent in a solvent, and then molding the negative active material composition to a certain shape or coating the negative active material composition on a current collector, such as copper foil.

The binder used for the negative electrode active material composition adjusts binding of the negative electrode active material and the conductive agent, and binding with the current collector. The amount of the binder may be about 1 to about 50 parts by weight based on 100 parts by weight of the negative electrode active material. For example, the amount of the binder may be about 1 to about 30 parts by weight, about 1 to about 20 parts by weight, or about 1 to about 15 parts by weight based on 100 parts by weight of the negative electrode active material. Examples of the binder may include polyvinylidenefluoride, polyvinylidenechloride, polybenzimidazole, polyimide, polyvinylacetate, polyacrylonitrile, polyvinyl alcohol, carboxymethylcellulose (CMC), starch, hydroxypropylcellulose, regenerated cellulose, polyvinylpyrrolidone, tetrafluoroethylene, polyethylene, polypropylene, polystyrene, polymethylmethacrylate, polyaniline, acrylonitrilebutadienestyrene, phenol resin, epoxy resin, polyethyleneterephthalate, polytetrafluoroethylene, polyphenylsulfide, polyamideimide, polyetherimide, polyethylenesulfone, polyamide, polyacetal, polyphenyleneoxide, polybutyleneterephthalate, ethylene-propylene-diene terpolymer (EPDM), sulfonated EPDM, styrene butadiene rubber, a fluoride rubber, and various copolymers.

The negative electrode may further include selectively a conductive agent in order to further improve electrical conductivity by providing a sufficient conductive passage to the negative active material. The conductive agent may be any conductive agent that is commonly used in lithium batteries. Examples of the conductive agent are a carbonaceous material such as carbon black, acetylene black, ketjen black, carbon fiber (for example, a vapor phase growth carbon fiber), or the like; a metal such as copper, nickel, aluminum, silver, or the like, each of which may be used in powder or fiber form; a conductive polymer such as a polyphenylene derivative; and a mixture thereof. An amount of the conductive agent may be appropriately controlled. For example, the conductive agent may be added in such an amount that a weight ratio of the negative active material to the conductive agent is in a range of about 99:1 to about 90:10.

Examples of the solvent include N-methylpyrrolidone (NMP), acetone, water, and the like. The amount of the solvent may be in a range of about 1 to about 10 parts by weight based on 100 parts by weight of the negative active material. When the amount of the solvent is within this range, a process for forming the negative active material layer may be facilitated.

In addition, the current collector is generally fabricated to have a thickness of about 3 to about 500 μm. The current collector may be any one of various current collectors that does not cause any chemical change in the fabricated battery and has conductivity. Examples of the current collector include copper, stainless steel, aluminum, nickel, titanium, calcined carbon, copper or stainless steel that is surface-treated with carbon, nickel, titanium or silver, and aluminum-cadmium alloys. In addition, the current collector may be processed to have fine irregularities on the surface thereof so as to enhance adhesive strength of the current collector to the negative active material, and may be used in any of various forms including films, sheets, foils, nets, porous structures, foams, and non-woven fabrics.

The negative active material composition may be directly coated on the current collector to manufacture a negative electrode plate. Alternatively, the negative electrode plate may be manufactured by casting the negative active material composition on a separate support to form a negative active material film, separating the negative active material film from the support, and laminating the negative active material film on a copper foil current collector. The negative electrode is not limited to the examples described above, and may have various shapes.

The negative active material composition is not only used in the preparation of the electrode of lithium batteries, but also used in the preparation of a printable battery by being printed on a flexible electrode substrate.

Separately, for the manufacture of a positive electrode, a positive active material composition is prepared by mixing a positive active material, a conductive agent, a binder, and a solvent.

Any lithium-containing metal oxide that is commonly used in the art may be used as the positive active material.

For example, the positive active material may include at least one selected from the group consisting of $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-y}Co_yO_2$ (where $0 \leq y<1$), $LiCo_{1-y}Mn_yO_2$ (where $0 \leq y<1$), $LiNi_{1-y}Mn_yO_2$ (where $0 \leq y<1$), $LiMn_{2-z}Ni_zO_4$ (where $0<z<2$), $LiMn_{2-z}Co_zO_4$ (where $0<z<2$), $LiCoPO_4$, and $LiFePO_4$.

The conductive agent, the binder, and the solvent used in the positive active material composition may be the same as or different from those of the negative active material composition as described above. If desired, a plasticizer may further be added to the positive active material composition and the negative active material composition to form pores inside the electrode plates. In this regard, the amounts of the positive active material, the conductive material, the binder, and the solvent may be the same level as those used in a conventional lithium battery.

The positive current collector may be any one of various current collectors that has a thickness ranging from about 3 to about 500 μm, does not cause any chemical change in the fabricated battery, and has high conductivity. For example, stainless steel, aluminum, nickel, titanium, calcined carbon, and aluminum or stainless steel that is surface-treated with carbon, nickel, titanium, silver, or the like may be used. The current collector may be processed to have fine irregularities on the surface thereof so as to enhance adhesive strength of the current collector to the positive active material. The positive electrode current collector may be used in any of various forms including films, sheets, foils, nets, porous structures, foams, and non-woven fabrics.

The prepared positive active material composition may be directly coated on the positive current collector and dried to prepare a positive electrode plate. Alternatively, the positive active material composition may be cast on a separate support, and then a film separated from the support is laminated on the positive current collector to prepare a positive electrode plate.

The positive electrode and the negative electrode may be separated from each other by a separator. Any separator that is commonly used for lithium batteries may be used. Particularly, a separator that has low resistance to migration of ions of an electrolyte and excellent electrolytic solution-retaining ability may be used. Examples of the separator may include glass fiber, polyester, Teflon, polyethylene, polypropylene, polytetrafluoroethylene (PTFE), and a combination thereof, each of which may be a nonwoven fabric or a woven fabric. The separator has a pore diameter of about 0.01 to about 10 μm and a thickness of about 5 to about 300 μm.

A lithium salt-containing non-aqueous electrolyte is composed of a non-aqueous electrolyte and lithium salt. As the non-aqueous electrolyte, a non-aqueous electrolyte solution, an organic solid electrolyte, or an inorganic solid electrolyte may be used.

Examples of the non-aqueous electrolyte solution may include any of aprotic organic solvents such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, acetonitrile, nitromethane, methyl formate, methyl acetate, phosphoric acid trimester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolyte may include a nitride, halide, or sulfate of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any one of various materials that are commonly used in lithium batteries. As a material that is easily dissolved in the non-aqueous electrolyte, for example, at least one of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, lithium chloroborate, lithium lower aliphatic carbonic acid, lithium 4 phenyl borate, and imide may be used.

Lithium batteries may be classified into lithium ion batteries, lithium ion polymer batteries, and lithium polymer batteries according to the types of a separator and electrolyte. In addition, lithium batteries may be classified into a cylindrical type, a rectangular type, a coin type, and a pouch type according to the shape of the battery, and may also be classified into a bulk type and a thin film type according to the size of the battery. Lithium batteries may be used either as primary lithium batteries or secondary lithium batteries.

A method of manufacturing a lithium battery is widely known in this field, and a detailed description thereof will not be provided here.

Figure 1:
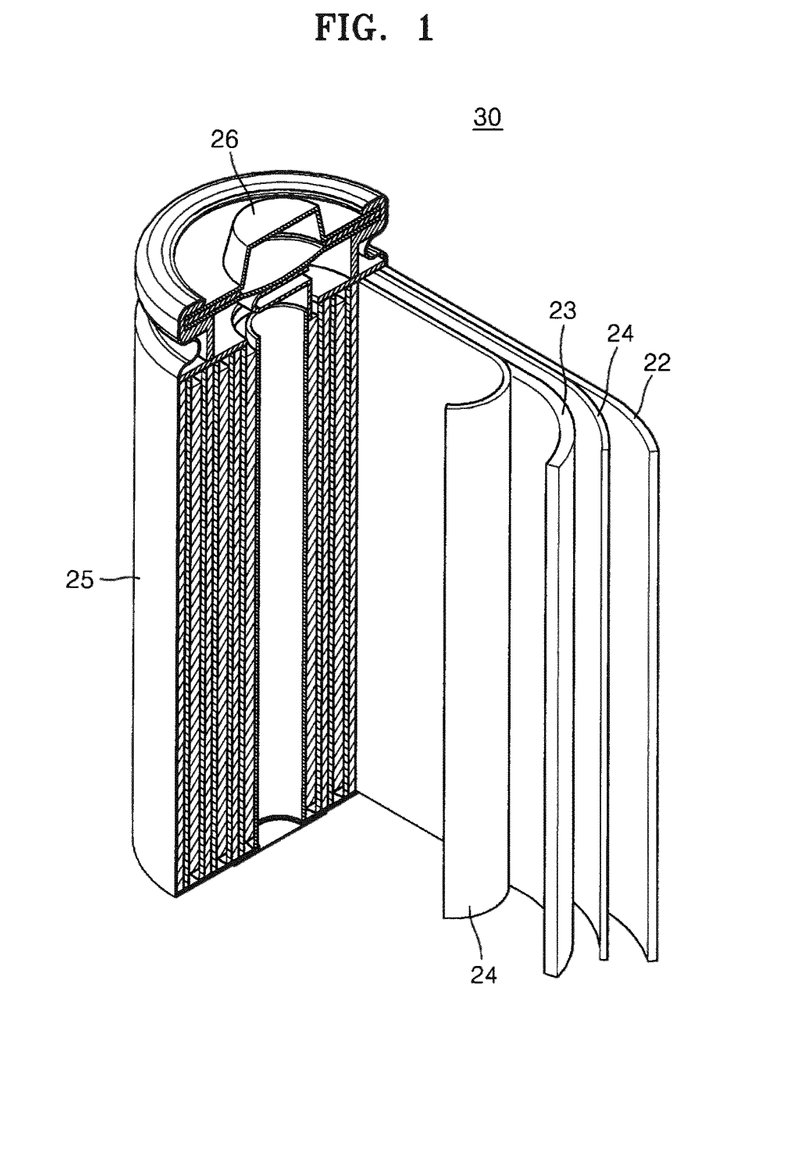
FIG. 1 is a schematic view of a structure of a lithium battery according to an embodiment of the present invention.

FIG. 1 is a schematic view of a structure of a lithium battery 30 according to an embodiment of the present invention.

Referring to FIG. 1, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded, and then accommodated in a battery case 25. Then, an electrolyte is injected into the battery case 25 and the battery case 25 is sealed by a sealing member 26, thereby completing the manufacture of the lithium battery 30. The battery case 5 may have a cylindrical shape, a rectangular shape or a thin-film shape. The lithium battery 30 may be a lithium ion battery.

The lithium battery may be suitable for use as power sources for electric vehicles and power tool requiring high capacity, high-power output, and high temperature conditions for operations, in addition to power sources for conventional mobile phones and portable computers, and may be coupled to conventional internal combustion engines, fuel cells, or super-capacitors to be used in hybrid vehicles. In addition, the lithium battery may be used in all applications requiring high-power output, high voltage, and high temperature conditions for operations.

Hereinafter, one or more embodiments of the present invention will be described in more detail with reference to the following examples. However, these examples are not intended to limit the purpose and scope of the one or more embodiments of the present invention.

Preparation of Negative Active Material

EXAMPLE 1

Si, Ti, and Ni were mixed in an atomic weight ratio of 68:16:16 (Si:Ti:Ni) and the mixture was added to a vacuum induction melting furnace (Yein Tech., Korea). The inside of the vacuum induction melting furnace was vacuumized using a vacuum pump, and Ar that is an inert gas was injected thereinto. A master alloy was prepared using a high frequency applying device while maintaining a power output of 8 kW for less than 5 minutes and monitoring the melting of the alloy. The atomic ratio of a matrix in the master alloy was $Si_7Ti_4Ni_4$, and the remaining 40 at % of silicon that was not contained in the matrix was precipitated and distributed in the matrix of the master alloy as nanoparticles.

The prepared master alloy was cut into large lumps and added to an injection-molding pipe of a melt spinner (Yein Tech., Korea), and then the master alloy was melted by high frequency induction heating in an Ar gas atmosphere, injection-molded to a ribbon shaped alloy by ejecting the melts onto a rotating wheel, and rapidly cooled and solidified. In this regard, the rotation speed of the wheel was 4,000 rpm, and a distance between the wheel and the injection-molding pipe was about 8 to about 10 mm. Before performing the injection-molding, a vacuum state was maintained at $10^{-4}$ Torr for 10 minutes, and the pressure of Ar gas was adjusted in the range of about 50 to 100 Torr.

The alloy ribbons were pulverized using a ball mill to prepare pulverized negative active material having an average particle diameter of about 3.4 μm. Zirconia balls having a diameter of 5 mm were used in the ball mill.

COMPARATIVE EXAMPLE 1

A negative active material according to Comparative Example 1 was prepared using the same master alloy prepared in Example 1. The master alloy was cut into large lumps and added to an injection-molding pipe of a melt spinner. Then, the master alloy was melted by high frequency induction heating the melted master alloy, and then was injection-molded to a ribbon shape by ejecting the melted master alloy to a rotating wheel. Then, the ribbon shaped alloy was rapidly cooled and solidified in the same manner as in Example 1.

However, the rotation speed of the wheel was 3,000 rpm and the distance between the injection-molding pipe and the wheel was in the range of about 8 to about 10 mm herein.

Before adding Ar gas thereto, a vacuum state was maintained at $10^{-4}$ Torr for 10 minutes, and the pressure of Ar gas was adjusted in the range of 250 to 300 Torr.

Then, the ball mill was applied thereto in the same manner as in Example 1 to prepare the negative active material.

EVALUATION EXAMPLE 1

FE-SEM Image Analysis of Negative Active Material

Figure 2:
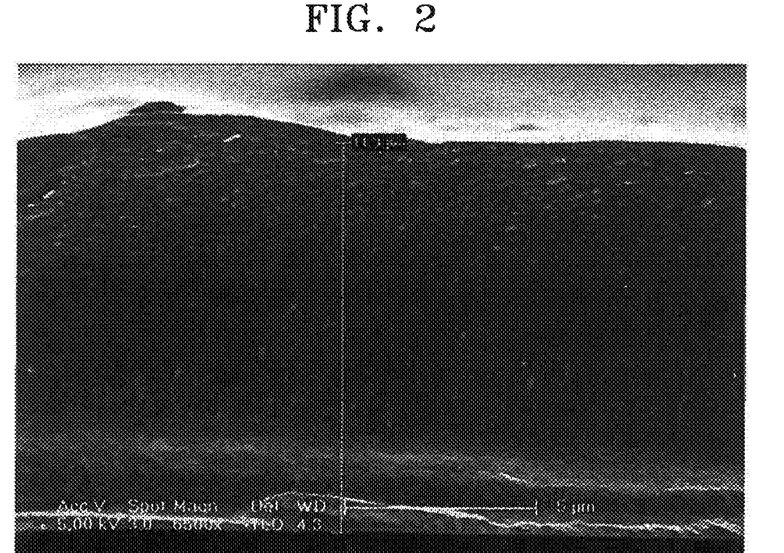
FIG. 2 is a field emission scanning electron microscope (FE-SEM) image of a cross-section of an alloy ribbon prepared by melt-spinning according to Example 1.
Figure 3:
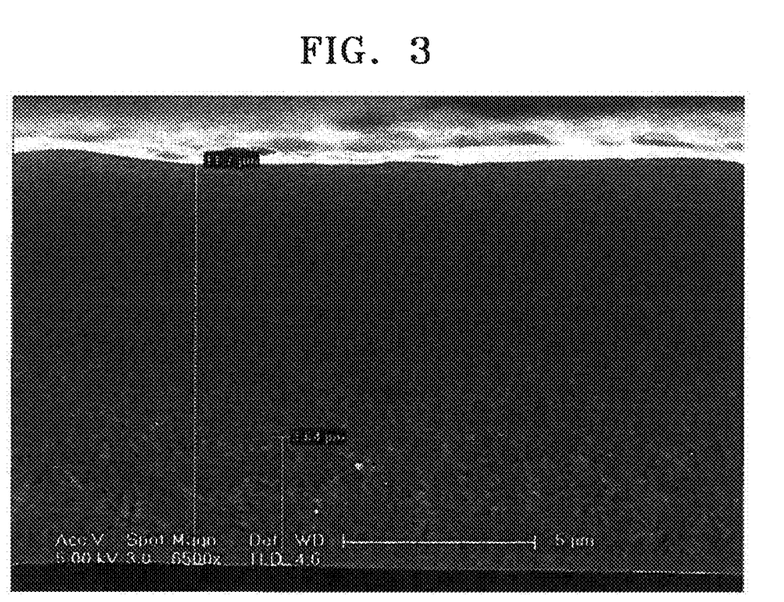
FIG. 3 is an FE-SEM image of a cross-section of an alloy ribbon prepared by melt-spinning according to Comparative Example 1.

FIGS. 2 and 3 show field emission scanning electron microscope (FE-SEM) images of cross-sections of an alloy ribbon prepared by melt-spinning according to Example 1 and Comparative Example 1.

As shown in FIGS. 2 and 3, the alloy ribbon prepared in Example 1 had a uniform dispersion of particle size distribution of silicon nanoparticles, in which silicon nanoparticles were precipitated in about 91% of a distribution area thereof. On the other hand, the alloy ribbon prepared in Comparative Example 1 had a wide dispersion of particle size distribution of silicon nanoparticles, in which silicon nanoparticles were precipitated in about 69% of a distribution area (e.g., the silicon nanoparticles were not uniformly distributed).

EVALUATION EXAMPLE 2

Analysis of Particle Size Distribution of Silicon Nanoparticles in Negative Active Material In order to identify the particle size distribution of silicon nanoparticles of the powder of the negative active materials prepared in Example 1 and Comparative Example 1, transmission electron microscope (TEM) images thereof were analyzed. An image of the distributed silicon nanoparticles was obtained by using the TEM, and a dispersion according to the size of the silicon nanoparticles was obtained by using an image analyzer. TEM images of Example 1 and Comparative Example 1 are shown in FIGS. 4 and 5.

Figure 4:
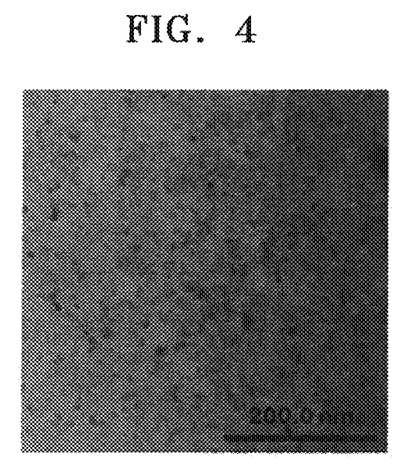
FIG. 4 is a transmission electron microscope (TEM) image of a powder of a negative active material prepared in Example 1.
Figure 5:
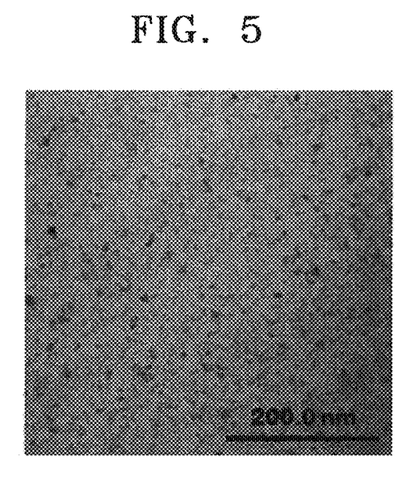
FIG. 5 is a TEM image of a powder of a negative active material prepared in Comparative Example 1.
Figure 6:
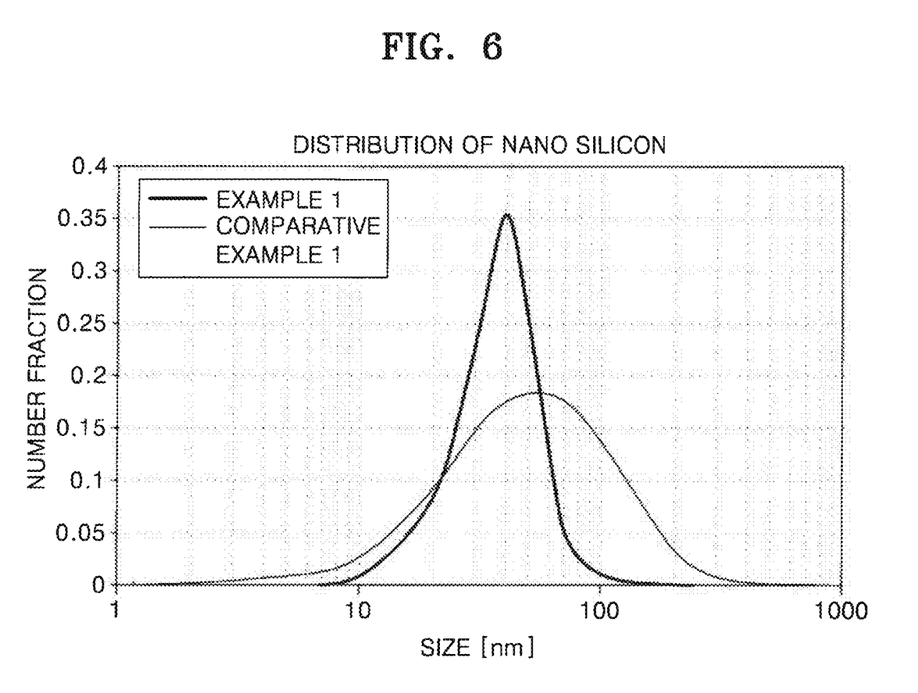
FIG. 6 is a graph illustrating particle size distribution of silicon nanoparticles obtained by analyzing TEM images of Example 1 and Comparative Example 1 (FIGS. 4 and 5) using an image analyzer.

Dark portions of the TEM images of FIGS. 4 and 5 indicate silicon nanoparticles, and particle size distributions of the silicon nanoparticles obtained by using an image analyzer is shown in FIG. 6.

As shown in FIG. 6, while the range of D10 to D90 of silicon nanoparticles prepared in Comparative Example 1 shows a wide dispersion in the range of about 5 to about 300 nm, the range of D10 to D90 of silicon nanoparticles prepared in Example 1 shows a narrow dispersion in the range of about 10 to about 75 nm. Thus, the negative active material prepared in Example 1 has better size dispersion characteristics of silicon nanoparticles than those prepared in Comparative Example 1.

Preparation of Lithium Battery

EXAMPLE 2

A negative active material slurry was prepared by mixing the negative active material prepared in Example 1, LSR7 (including 23 wt % of PAI and 97 wt % of N-methyl-2-pyrrolidone, Hitachi Chemical) as a binder, ketjen black as a conductive agent at a weight ratio of 84:4:8 and adding N-methylpyrrolidone to the mixture to adjust viscosity until a solid content thereof reached 60 wt %. The prepared slurry was coated on a copper foil current collector having a thickness of 10 μm to manufacture a negative electrode plate. The completely coated electrode plate was dried at a temperature of 110° C. for 15 minutes, followed by pressing, thereby completing the manufacture of a negative electrode having a density of 1.5 g/cc. The dried negative electrode plate was heat-treated in a vacuum at 350° C. for 1 hour, and the electrode plate was cut to a size of 16 mm to prepare a negative electrode to be applied to a coin cell. A Li metal as a reference electrode and a polyethylene separator having a thickness of 20 μm (product name: STAR20, Asahi) were used, and an electrolyte was injected thereto, and the resultant structure was pressed to complete the manufacture of a 2016R type coin cell. In this case, the electrolyte was 1.10 M $LiPF_6$ dissolved in a mixed solvent of ethylene carbonate (EC), ethylmethyl carbonate (EMC), and diethyl carbonate (DEC) at a volumetric ratio of EC:EMC:DEC of 3:3:4.

COMPARATIVE EXAMPLE 2

A coin cell was manufactured in the same manner as in Example 2, except that the negative active material prepared in Comparative Example 1 was used instead of the negative active material prepared in Example 1.

Evaluation of Cell Performance

EVALUATION EXAMPLE 5

Measuring of Volumetric Expansion Rate of Electrode

Figure 7:
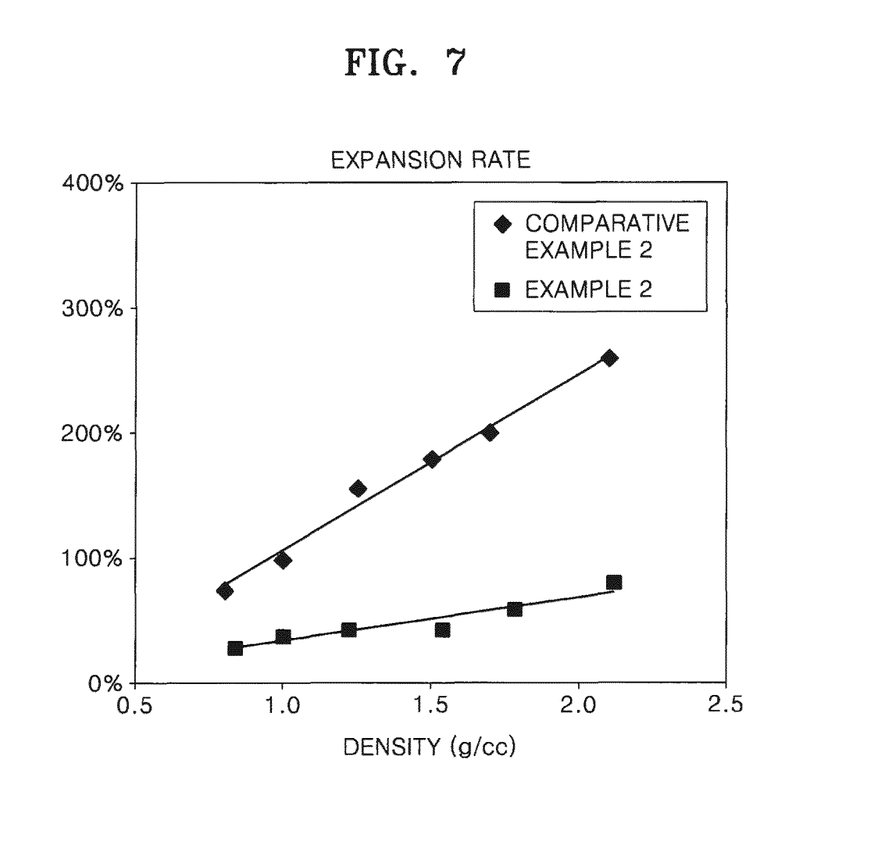
FIG. 7 is a graph illustrating volumetric expansion rates of negative electrodes of coin cells prepared according to Example 2 and Comparative Example 2.

The coin cells prepared in Example 2 and Comparative Example 2 were charged (formation) at a current of 0.1 C, and then the coin cells were disassembled to compare a thickness of a negative electrode plate before and after the charging and a volumetric expansion ratio of the negative electrodes of the coin cells was measured. The results thereof are shown in FIG. 7 and Table 1.

The volumetric expansion rate of the negative electrode plate is shown in Equation 1 below.

$$\text{Volumetric expansion rate} = \{(\text{thickness of electrode plate thickness after expansion})/(\text{thickness of initial electrode plate} = \text{substrate thickness})\} \times 100 \quad \text{Equation 1}$$

TABLE 1

| Comparative Example 2 | | Example 2 | |
| --- | --- | --- | --- |
| Density | Expansion rate | Density | Expansion rate |
| 0.80 | 75% | 0.84 | 30% |
| 1.00 | 100% | 1.00 | 39% |
| 1.25 | 156% | 1.22 | 44% |
| 1.50 | 179% | 1.54 | 43% |
| 1.70 | 200% | 1.78 | 58% |
| 2.10 | 260% | 2.12 | 80% |

As shown in FIG. 7 and Table 1, upon comparing difference of expansion rates between Comparative Example 2 and Example 2, the expansion rate increases as the density of the active material increases in the electrode plate, and this result is more apparent in Comparative Example 2. Since the dispersion of particle size of the silicon nanoparticles was improved in Example 2, the volumetric expansion thereof was inhibited (or reduced). Thus, in Example 2, the increase in expansion according to the density was less than that of Comparative Example 2. When the density was 1.0 g/cc, the volumetric expansion rate of the negative electrode plate of Comparative Example 2 was 100%, but the volumetric expansion of that of Example 2 was 39%. In order to prepare a high-capacity cell, the density should be increased. However, the difference of the expansion rate of the negative electrode plates between Comparative Example 2 and Example 2 was further increased as the density increased.

EVALUATION EXAMPLE 6

Charge-Discharge Test

Charging and discharging of coin cells prepared in Example 2 and Comparative Example 2 were repeatedly performed 50 times at a rate of 1.0 C. Then, cycle characteristics thereof were compared with each other.

Figure 8:
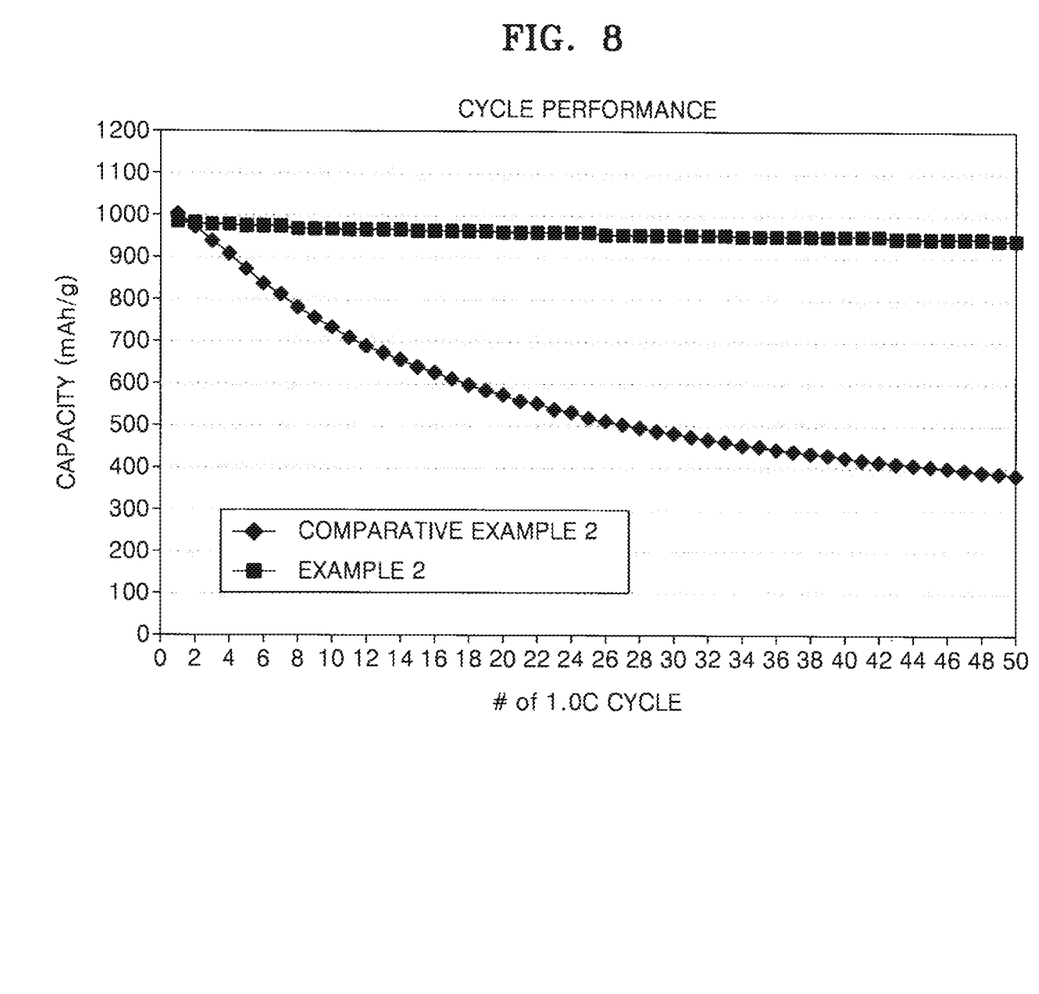
FIG. 8 is a graph illustrating discharge capacity per cycle of coin cells prepared according to Example 2 and Comparative Example 2.
Figure 9:
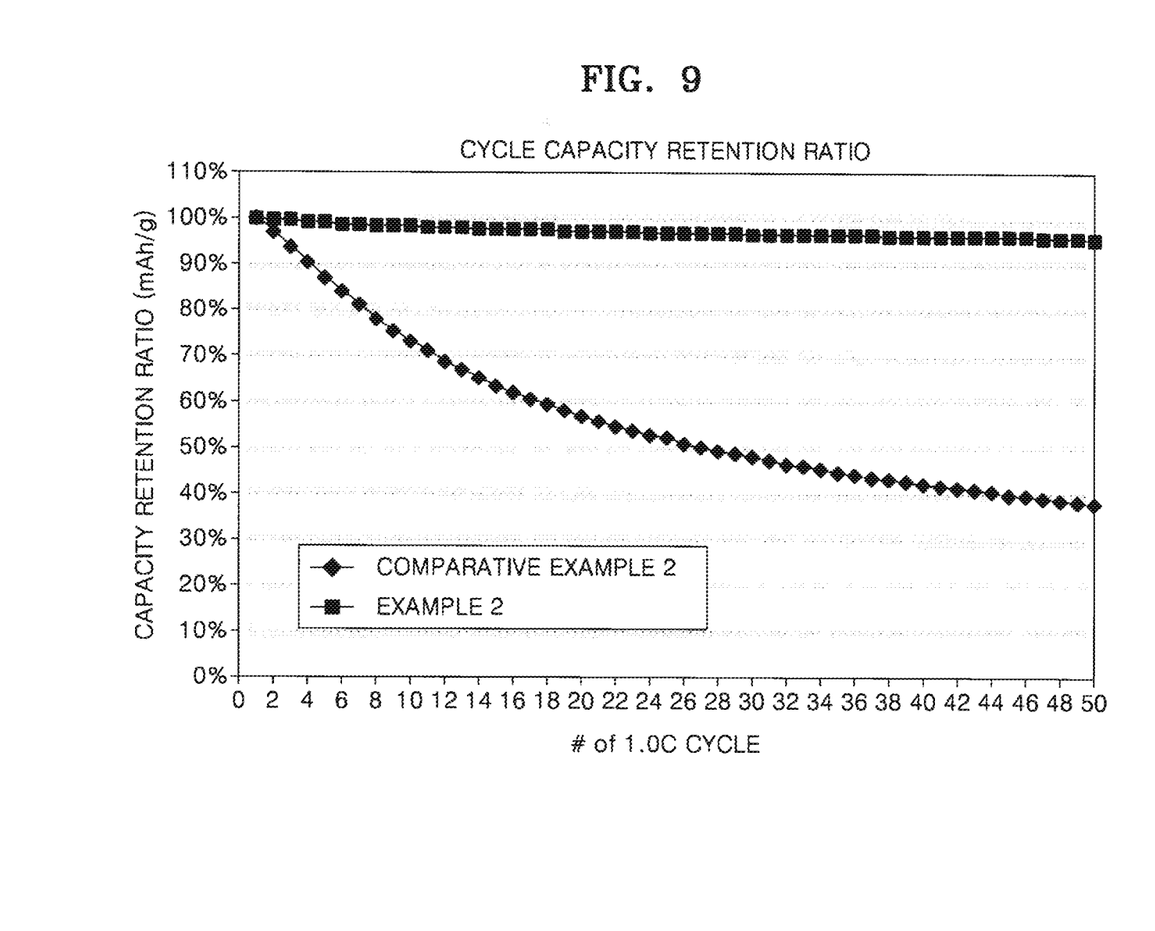
FIG. 9 is a graph illustrating capacity retention rates per cycle of coin cells prepared according to Example 2 and Comparative Example 2.

During the charging and discharging of the coin cells prepared in Example 2 and Comparative Example 2, discharge capacity and capacity retention rate of each cycle were measured, and the results are shown in FIGS. 8 and 9, respectively.

The capacity retention ratio (CRR) is defined as Equation 2 below.

Capacity retention ratio[%]=[Discharge capacity at each cycle/Discharge capacity at $1^{st}$ cycle]×100   Equation 2

As shown in FIGS. 8 and 9, the discharge capacity of the coin cell prepared in Example 2 was higher than the discharge capacity of that of Comparative Example 2 by about 550 mAh/g after charging and discharging were repeated 50 times at a rate of 1.0 C. While the capacity retention rate of the discharge capacity of the coin cell prepared in Comparative Example 2 was 38%, the capacity retention rate of that of Example 2 was highly maintained at 95% after charging and discharging were repeated 50 times. This is because the volumetric expansion was inhibited (or reduced) by controlling the particle size distribution of the silicon nanoparticles. While the CRR of the coin cell prepared in Comparative Example 2 was low due to volumetric expansion of the active material, the discharge capacity of the coin cell prepared in Example 2 was maintained after 50 times of charging and discharging since the volumetric expansion of the active material was inhibited (or reduced).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. Descriptions of features or aspects within each embodiment should typically be considered as available for other similar features or aspects in other embodiments.

EXPLANATION OF REFERENCE NUMERALS

30: lithium battery
22: negative electrode layer
23 positive electrode layer
24: separator
25: battery case
26: sealing member

What is claimed is:

1. A negative active material for a lithium battery comprising:
   a silicon-based alloy comprising:
      a silicon alloy-based matrix; and
      silicon nanoparticles distributed in the silicon alloy-based matrix,
      wherein a particle size distribution of the silicon nanoparticles satisfies D10≥10 nm and D90≤75 nm.

2. The negative active material of claim 1, wherein the silicon-based alloy comprises silicon (Si) and at least one metal selected from the group consisting of Ca, Sc, Ti, V, Cr, Mn, Fe, Co, Ni, Cu, Zn, Sr, Y, Zr, Nb, Ba, Lu, Hf, Ta, and Lanthanum group elements.

3. The negative active material of claim 2, wherein the content of Si in the silicon-based alloy is 40 at % or greater based on 100 at % of the silicon-based alloy.

4. The negative active material of claim 1, wherein the silicon-based alloy comprises Si, M', and M", and wherein M' is Al, Ti, or Fe, and M" is Ni, Fe, or Mn.

5. The negative active material of claim 4, wherein the content of Si in the silicon-based alloy is in a range of 40 to 80 at %, the content of M' in the silicon-based alloy is in a range of 10 to 30 at %, and the content of M" in the silicon-based alloy is in a range of 10 to 30 at % based on 100 at % of the silicon-based alloy.

6. The negative active material of claim 1, wherein the silicon-based alloy comprises inactive silicon and active silicon, and wherein the silicon alloy-based matrix comprises the inactive silicon, and the silicon nanoparticles comprise the active silicon.

7. The negative active material of claim 6, wherein the active silicon is present in an amount in a range of 40 to 80 at % based on 100 at % of the total amount of inactive silicon and active silicon in the silicon-based alloy, and wherein the inactive silicon is present in an amount in a range of 20 to 60 at % based on 100 at % of the total amount of inactive silicon and active silicon in the silicon-based alloy.

8. The negative active material of claim 1, wherein the silicon alloy-based matrix is represented by Si-M'-M", wherein M' is Al, Ti, or Fe, and M" is Ni, Fe, or Mn, and wherein the silicon alloy-based matrix comprises 40 to 60 at % of Si, 20 to 30 at % of M', and 20 to 30 at % of M" based on 100 at % of the total amount of the silicon alloy-based matrix.

9. The negative active material of claim 1, wherein more than 60% of the silicon nanoparticles have a particle size in a range of 28 to 65 nm.

10. The negative active material of claim 1, wherein the silicon nanoparticles have a particle size distribution such that D50 is in a range of 35 to 50 nm.

11. The negative active material of claim 1, wherein the silicon nanoparticles have a particle size distribution such that the ratio of D90/D10 is in a range of 8.5 to 10, and the ratio of D50/D10 is in a range of 5.5 to 7.2.

12. The negative active material of claim 1, wherein the negative active material further comprises a carbonaceous material for intercalating and deintercalating lithium ions, lithium metal, an alloy of lithium metal, a silicon oxide-based material, or a mixture thereof.

13. A lithium battery comprising:
   a negative electrode comprising a negative active material comprising:
      a silicon-based alloy comprising:
         a silicon alloy-based matrix; and
         silicon particles distributed in the silicon alloy-based matrix,
         wherein a particle size distribution of the silicon particles satisfies D10≥10 nm and D90≤75 nm;
   a positive electrode opposite the negative electrode; and
   an electrolyte between the negative electrode and the positive electrode.

* * * * *